US009361732B2

(12) United States Patent
Ebstyne et al.

(10) Patent No.: US 9,361,732 B2
(45) Date of Patent: Jun. 7, 2016

(54) TRANSITIONS BETWEEN BODY-LOCKED AND WORLD-LOCKED AUGMENTED REALITY

(71) Applicant: MICROSOFT TECHNOLOGY LICENSING, LLC, Redmond, WA (US)

(72) Inventors: Michael John Ebstyne, Seattle, WA (US); Frederik Schaffalitzky, Bellevue, WA (US); Stephen Latta, Seattle, WA (US); Paul Albert Lalonde, Victoria (CA); Drew Steedly, Redmond, WA (US); Alex Kipman, Redmond, WA (US); Ethan Eade, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 82 days.

(21) Appl. No.: 14/267,624

(22) Filed: May 1, 2014

(65) Prior Publication Data

US 2015/0317831 A1    Nov. 5, 2015

(51) Int. Cl.
| | |
|---|---|
| *G06T 15/00* | (2011.01) |
| *G06T 19/00* | (2011.01) |
| *G06T 13/80* | (2011.01) |
| *G06F 3/01* | (2006.01) |
| *G02B 27/01* | (2006.01) |
| *G06F 3/0481* | (2013.01) |
| *G06F 3/0346* | (2013.01) |

(52) U.S. Cl.
CPC .............. *G06T 19/006* (2013.01); *G02B 27/017* (2013.01); *G02B 27/0172* (2013.01); *G06F 3/011* (2013.01); *G06F 3/017* (2013.01); *G06F 3/0346* (2013.01); *G06F 3/04815* (2013.01); *G06T 13/80* (2013.01)

(58) Field of Classification Search
None
See application file for complete search history.

(56) References Cited

U.S. PATENT DOCUMENTS

| | | | |
|---|---|---|---|
| 6,997,882 B1 | 2/2006 | Parker et al. | |
| 7,145,478 B2 | 12/2006 | Goncalves et al. | |
| 7,831,094 B2 | 11/2010 | Gupta et al. | |
| 8,749,560 B2 * | 6/2014 | Ording | G06T 13/80 345/473 |
| 2003/0184602 A1 * | 10/2003 | Kuroki | G02B 27/017 715/856 |
| 2011/0158478 A1 * | 6/2011 | Yamada | G02B 6/0006 382/103 |
| 2012/0299961 A1 * | 11/2012 | Ramkumar | G06F 17/30047 345/632 |
| 2013/0021373 A1 * | 1/2013 | Vaught | G02B 27/017 345/633 |
| 2013/0050258 A1 | 2/2013 | Liu et al. | |
| 2013/0083018 A1 | 4/2013 | Geisner et al. | |
| 2013/0326364 A1 | 12/2013 | Latta et al. | |
| 2014/0225898 A1 * | 8/2014 | Fyke | G06T 11/00 345/473 |

OTHER PUBLICATIONS

Salas-Moreno, Renato F., et al. "Slam++: Simultaneous Localisation and Mapping at the Level of Objects", IEEE Conference on Computer Vision and Pattern Recognition, IEEE, Jun. 2013, 8 pages.

(Continued)

*Primary Examiner* — Kee M Tung
*Assistant Examiner* — Frank Chen
(74) *Attorney, Agent, or Firm* — Dan Choi; Judy Yee; Micky Minhas (57) ABSTRACT

Various embodiments relating to controlling a see-through display are disclosed. In one embodiment, virtual objects may be displayed on the see-through display. The virtual objects transition between having a position that is body-locked and a position that is world-locked based on various transition events.

16 Claims, 6 Drawing Sheets

(56) References Cited

OTHER PUBLICATIONS

Newcombe, Richard A., et al. "KinectFusion: Real-Time Dense Surface Mapping and Tracking", 10th IEEE International Symposium on Mixed and Augmented Reality (ISMAR), Oct. 2011, 10 pages.

Zhai, Shumin et al., "Anisotropic Human Performance in Six Degree-of-Freedom Tracking: An Evaluation of Three-Dimensional Display and Control Interfaces", IEEE Transactions on Systems, Man and Cybernetics, Part A: Systems and Humans, vol. 27, No. 4, Jul. 1997, pp. 518-528.

Hallaway, Drexel et al., "Bridging the Gaps: Hybrid Tracking for Adaptive Mobile Augmented Reality", Applied Artificial Intelligence vol. 18, No. 6, Jul. 2004, pp. 477-500.

Eissele, Mike et al., "Context-Controlled Flow Visualization in Augmented Reality." Proceedings of Graphics Interface 2008. Canadian Information Processing Society, May 2008. 8 pages.

Broll, Wolfgang et al., "The Virtual Round Table-a Collaborative Augmented Multi-User Environment", Proceedings of the Third International Conference on Collaborative Virtual Environments, Sep. 2000, 7 pages.

Azuma, Ronald, et al. "Tracking in Unprepared Environments for Augmented Reality Systems", Computers & Graphics, vol. 23, No. 6, Nov. 1999, pp. 787-793.

ISA European Patent Office, International Search Report and Written Opinion Issued in Application No. PCT/US2015/027857, Jul. 14, 2015, WIPO, 14 Pages.

IPEA European Patent Office, Second Written Opinion Issued in Application No. PCT/US2015/027857, Apr. 6, 2016, WIPO 11 pages.

\* cited by examiner

TRANSITIONS BETWEEN BODY-LOCKED AND WORLD-LOCKED AUGMENTED REALITY

BACKGROUND

Various technologies may allow a user to experience a mix of real and virtual reality. For example, some display devices, such as various head mounted display (HMD) devices, may comprise a see-through display that allows superposition of virtual objects over a real-world environment. The virtual objects may appear integrated with the real-world environment when viewed by a wearer of the HMD device through the see-through display. Such a relationship between the virtual objects and the real-world environment may be referred to as augmented reality.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various embodiments relating to controlling a see-through display are disclosed. In one embodiment, virtual objects may be displayed via the see-through display. The virtual objects transition between having a position that is world-locked and a position that is body-locked based on various transition events. A world-locked position appears to be fixed relative to real-world objects viewable through the see-through display and the world-locked position of each virtual object appears to be moveable relative to a wearer of the see-through display. A body-locked position appears to be fixed relative to the wearer of the see-through display and the body-locked position of each virtual object appears to be moveable relative to the real-world objects.

DETAILED DESCRIPTION

The present description relates to controlling a see-through display of a head mounted display (HMD) device to provide an immersive augmented reality experience that has consistent quality of operation. More particularly, the present description relates to controlling a see-through display device to create a single experience while seamlessly transitioning between two different tracking systems that are associated with two different display modes.

In the first display mode, one or more virtual objects may be displayed on the see-through display with world-locked positions. A world-locked position of a virtual object appears to be fixed relative to real-world objects viewable through the see-through display and the world-locked position of each virtual object appears to be moveable relative to a wearer of the see-through display. The first display mode may be associated with a first tracker that estimates a location and an orientation of the HMD device in six degrees of freedom (e.g., x, y, z, pitch, roll, yaw). For example, the estimate in six degrees of freedom may be determined using information from a combination of optical sensors and other pose sensors that do not rely merely on optical information, such as accelerometers, gyroscopes, magnetometers, or other sensors used in deduced reckoning of a current position/orientation by using one or more previously determined positions/orientations and known or estimated changes over designated time periods. The optical sensors may provide feedback of optical features of a real-world environment in which the HMD device is located. Due to the reliance on light conditions and optical features of the real-world environment to provide feedback, the optical sensors may be complex and as a result may not always be reliable. However, the augmented reality experience provided by the first display mode may be extremely rich and compelling when conditions are suitable to provide accurate feedback.

If conditions are not suitable to consistently display virtual objects with world-locked positions in the first display mode, then the HMD device may transition to operation in the second display mode. In the second display mode, one or more virtual objects may be displayed on the see-through display with body-locked positions. A body-locked position of a virtual object appears to be fixed relative to the wearer of the see-through display and the body-locked position of each virtual object appears to be moveable relative to the real-world objects. The second display mode may be associated with a second tracker that operates in parallel with the first tracker. The second tracker estimates an orientation of the HMD device in three degrees of freedom (e.g., pitch, roll, yaw). For example, the estimate in three degrees of freedom may be determined using information from pose sensors that do not rely on optical feedback. Accordingly, the second tracker may operate consistently during conditions in which the first tracker may provide a degraded augmented reality experience.

By using multiple tracking technologies built into a single HMD device, a high quality augmented reality experience may be consistently provided via transitions between display modes even as environmental conditions change. In other approaches, when environmental conditions do not offer a single tracker sufficient data to support tracking and mapping, such devices simply fail to provide a consistent high quality augmented reality experience.

Figure 1:
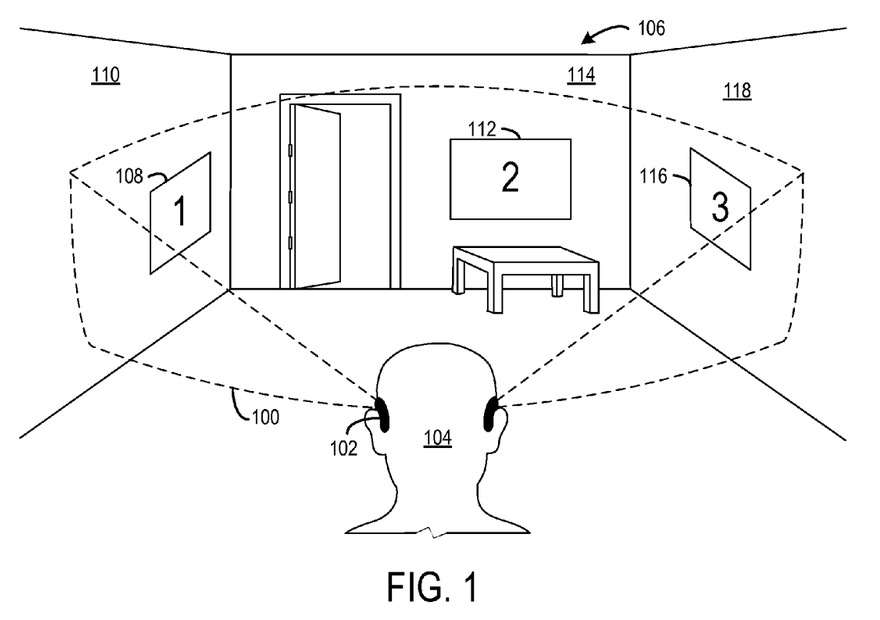
FIGS. 1 and 2 show a plurality of virtual objects with a world-locked position in accordance with an embodiment of the present disclosure.
Figure 2:
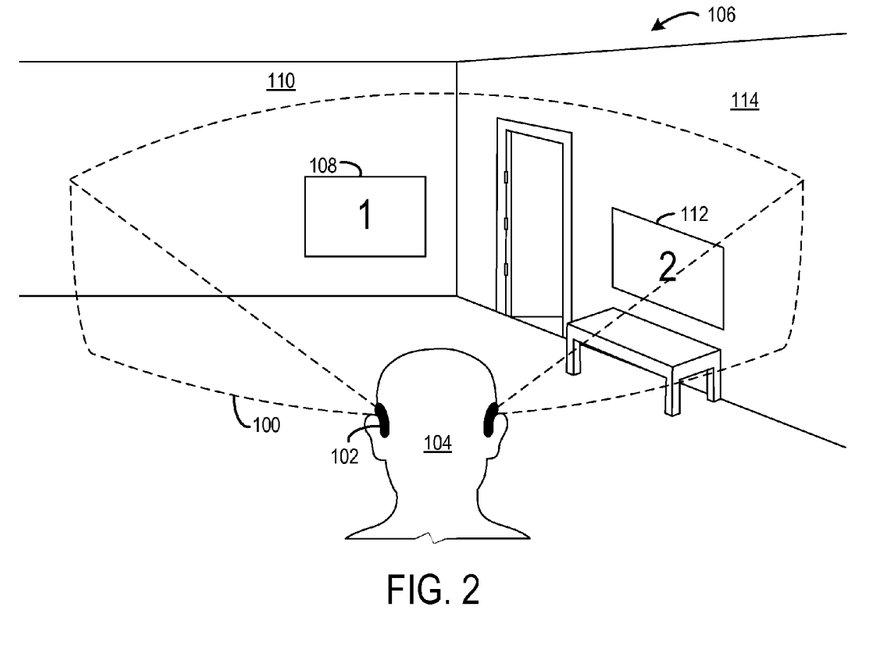

FIGS. 1-6 show different scenarios of virtual objects being displayed on a see-through display 100 of a HMD device 102 from a perspective of a wearer 104 of the HMD device. More particularly, the different scenarios shows the HMD device operating in different display modes based on conditions of a real-world environment. FIGS. 1 and 2 show an example scenario where conditions of a real-world environment 106 are suitable for the HMD device 102 to operate in a first display mode where a plurality of virtual objects (e.g., video slates 1, 2, 3) are displayed on the see-through display 100 with world-locked positions. In particular, the real-world environment 106 is a room having various optical features, such as a table, doorway, etc. that may provide suitable feedback to provide accurate tracking and mapping of the location and the orientation of the HMD device in six degrees of freedom. Such tracking in six degrees of freedom allows the video slates to have world locked positions in the real-world environment.

In FIG. 1, a first video slate 108 appears to be hanging on a left-side wall 110 of the room 106 relative to the location and orientation of the wearer 104 of the HMD device 102. A second video slate 112 appears to be hanging on a front facing wall 114 of the room 106 relative to the location and orientation of the wearer 104 of the HMD device 102. A third video slate 116 appears to be hanging on a right-side wall 118 relative to the location and orientation of the wearer 104 of the HMD device 102.

In FIG. 2, the wearer 104 of the HMD device 102 has rotated to the left, so that he/she is facing the wall 110 and the location and the orientation of the HMD device changes. However, since the HMD device is operating in the first display mode, and the video slates have world-locked positions, the first video slate 108 appears to be fixed on the wall 110 relative to the other real-world objects viewable through the see-through display. Likewise, the second video slate 112 appears to be fixed on the wall 114 relative to the other real-world objects viewable through the see-through display. Correspondingly, the world-locked position of each of the first and second video slates appears to move relative to the wearer of the see-through display.

It will be understood that the HMD device may display any suitable number of video slates as virtual objects having world-locked positions on the see-through display. It will be understood that the video slates may present any suitable video or other images. For example, the video slates may present one or more web pages, email applications, weather reports, television, news, photographs, etc.

Furthermore, it will be understood that the plurality of video slates may be located in any suitable world-locked position within the room. In some embodiments, the plurality of video slates may be displayed according to a predefined visual layout. In some embodiments, the predefined visual layout may be location-specific. For example, optical feedback of the tracking system may be used to recognize that the real-world environment is a particular location, such as the wearer's office. The plurality of video slates may be placed in particular locations within the office according to the location-specific visual layout. On the other hand, if a real-world environment is unrecognized, the plurality of video slates may be placed according to a default visual layout. In other embodiments, the visual layout may be location independent, and the video slates may be displayed in the same world-locked positions in any location while operating in the first display mode.

Figure 3:
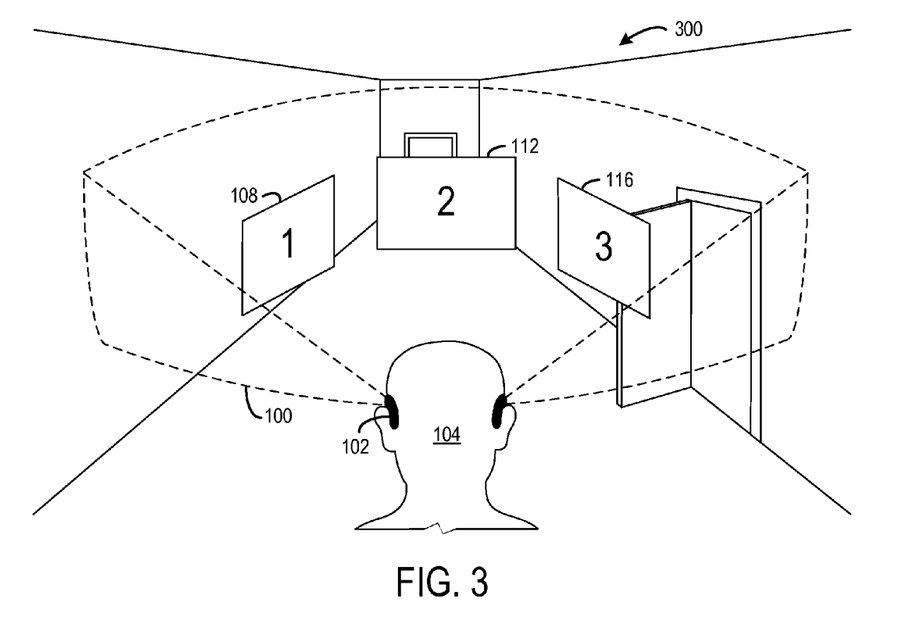
FIGS. 3 and 4 show a plurality of virtual objects with a body-locked position in accordance with an embodiment of the present disclosure.
Figure 4:
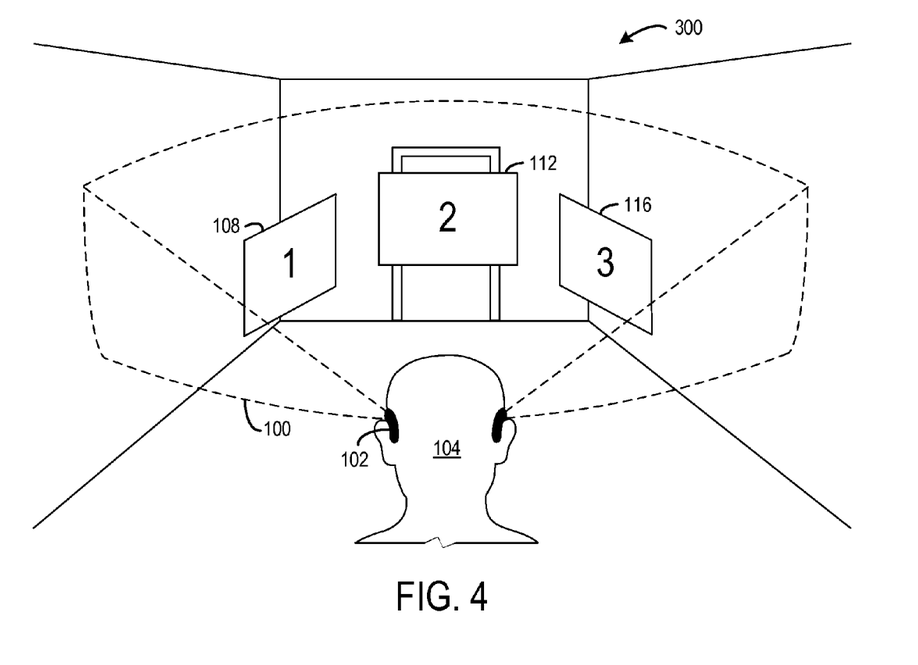

FIGS. 3 and 4 show an example scenario where conditions of the real-world environment change causing a transition event in which the HMD device 102 switches from operation in the first display mode to operation in the second display mode. In this case, the transition event occurs when the wearer of the HMD device moves through the doorway of the room 106 shown in FIGS. 1 and 2 and into a hallway 300. For example, the transition event may occur based on the estimate of the location and the orientation of the HMD device in six degrees of freedom not meeting a quality metric. In one example, sensor information used to perform the estimate may not be available. In another example, the estimate may not have sufficient confidence.

In the second display mode, the plurality of video slates may be displayed on the see-through display 100 with body-locked positions. For example, the plurality of video slates may appear in a spherical workspace layout where the wearer 104 of the HMD device 102 stands in the center of the sphere and the plurality of video slates surround him/her. In some embodiments, the plurality of video slates may be arranged according to a predefined visual layout. In one particular example, a news application could be displayed in the first video slate on the left-side, an email application could be displayed on in the second video slate in the middle, and a stock ticker application could be displayed in the third video slate on the right-side.

In some embodiments, the virtual objects may visually transition over a series of image frames from the world-locked position to the body-locked position via an animation. For example, when the wearer leaves the room and enters the hallway, the video slates could appear to suddenly fly off the world-locked positions on the walls and transition to body-locked positions in the spherical work space. The flying animation may appear to the wearer of the HMD device like a natural action that eases the transition in display modes.

In FIG. 3, the wearer 104 of the HMD device 102 is standing at an end of the hallway 300, next to the doorway from the room 106. The plurality of video slates is displayed on the see-through display 100 with body-locked positions that appear to be fixed relative to the wearer and moveable relative to real-world objects, such as the doorway.

In FIG. 4, the wearer 104 of the HMD device 102 has walked down to the other end of the hallway 300 and is standing in front of another doorway. Since the plurality of video slates are displayed on the see-through display 100 with body-locked positions, the plurality of video slates stay fixed relative to the wearer 104 even as he/she walks down the hallway. In other words, the slates move with the wearer. The plurality of video slates may be displayed on the see-through display 100 with body-locked positions until a transition event occurs that causes a switch to the first display mode, at which point the plurality of video slates may transition to world-locked positions. For example, when tracking in six degrees of freedom becomes available again, the plurality of slates could visually transition from the body-locked positions and attach to walls around the wearer of the HMD device in a predefined visual layout. The visual transition may include an animation, such as the visual slates appearing to fly out from the spherical workspace to the wall and enlarging along the way so that content presented in the video slates can still be seen in the world-locked position.

Figure 5:
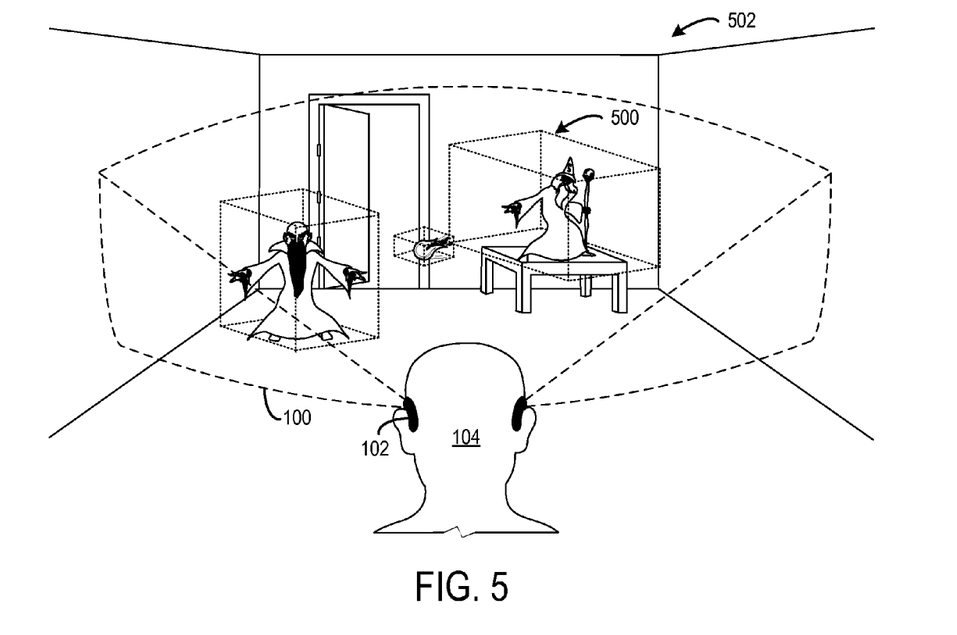
FIG. 5 shows a plurality of virtual objects as volumetric holograms with world-locked positions in accordance with an embodiment of the present disclosure.
Figure 6:
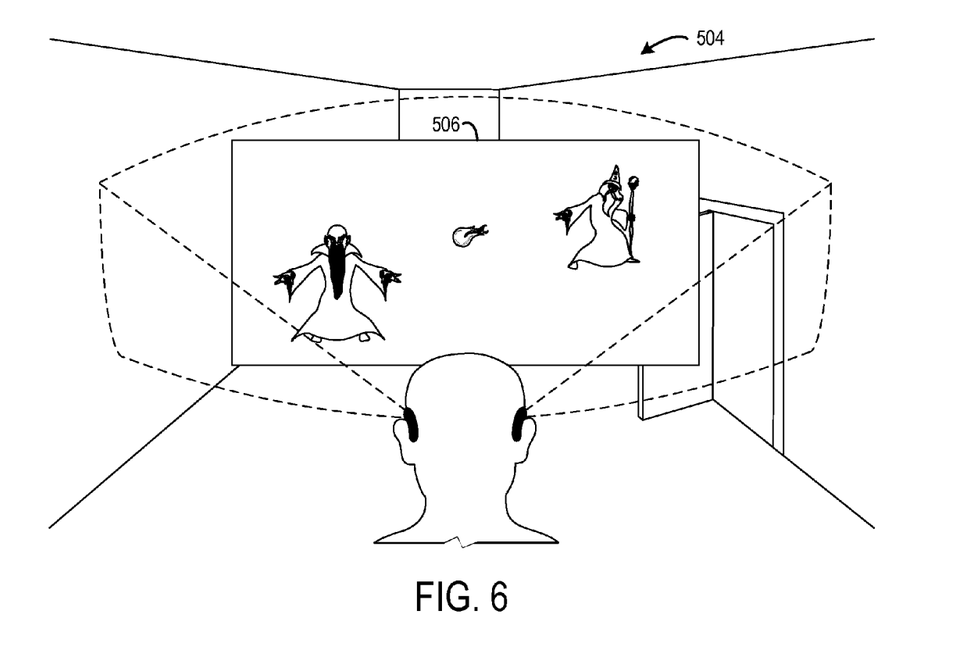
FIG. 6 shows a plurality of virtual objects displayed in a screen viewport with a body-locked position in accordance with an embodiment of the present disclosure.

FIGS. 5 and 6 show an example scenario where a plurality of virtual objects are shown in a 3D view in the first display mode and then visually transition to a 2D view in the second display mode. In FIG. 5, the HMD device 102 is operating in the first display mode in which a plurality of virtual objects in the form of volumetric holograms (e.g., 3D meshes) 500 may be displayed on the see-through display 100 in a 3D view. The volumetric holograms may have world-locked positions in the real-world environment (e.g., a room) 502 and may appear to occupy a volume within the real-world environment.

In FIG. 6, the wearer 104 of the HMD device 102 has walked through the doorway of the room 502 and into a hallway 504, which causes a transition event to occur in which the HMD device 102 switches from the first display mode to the second display mode. In response to the transition event, the volumetric meshes visually transition from the 3D view to a 2D view. In particular, the volumetric meshes may collapse to a 2D view of a video slate 506. The video slate may be a screen viewport of a virtual world that the virtual objects inhabit. The video slate 506 may have a body-locked position and the virtual objects may move within the virtual world depicted in the video slate.

In some embodiments, in response to the transition event, the HMD device may capture an image of the real-world environment and display the image in the video slate. Further, the virtual objects could be shown in their corresponding real-world positions in the image from the last known point of view before the transition event occurred.

Further, when a later transition event occurs (e.g., when tracking in six degrees of freedom becomes available again), the video slate could expand to refill the room (or another current real-world location of the HMD device), and the images of the virtual objects in the video slate could expand to volumetric holograms in the real-world environment with world-locked positions.

Figure 7:
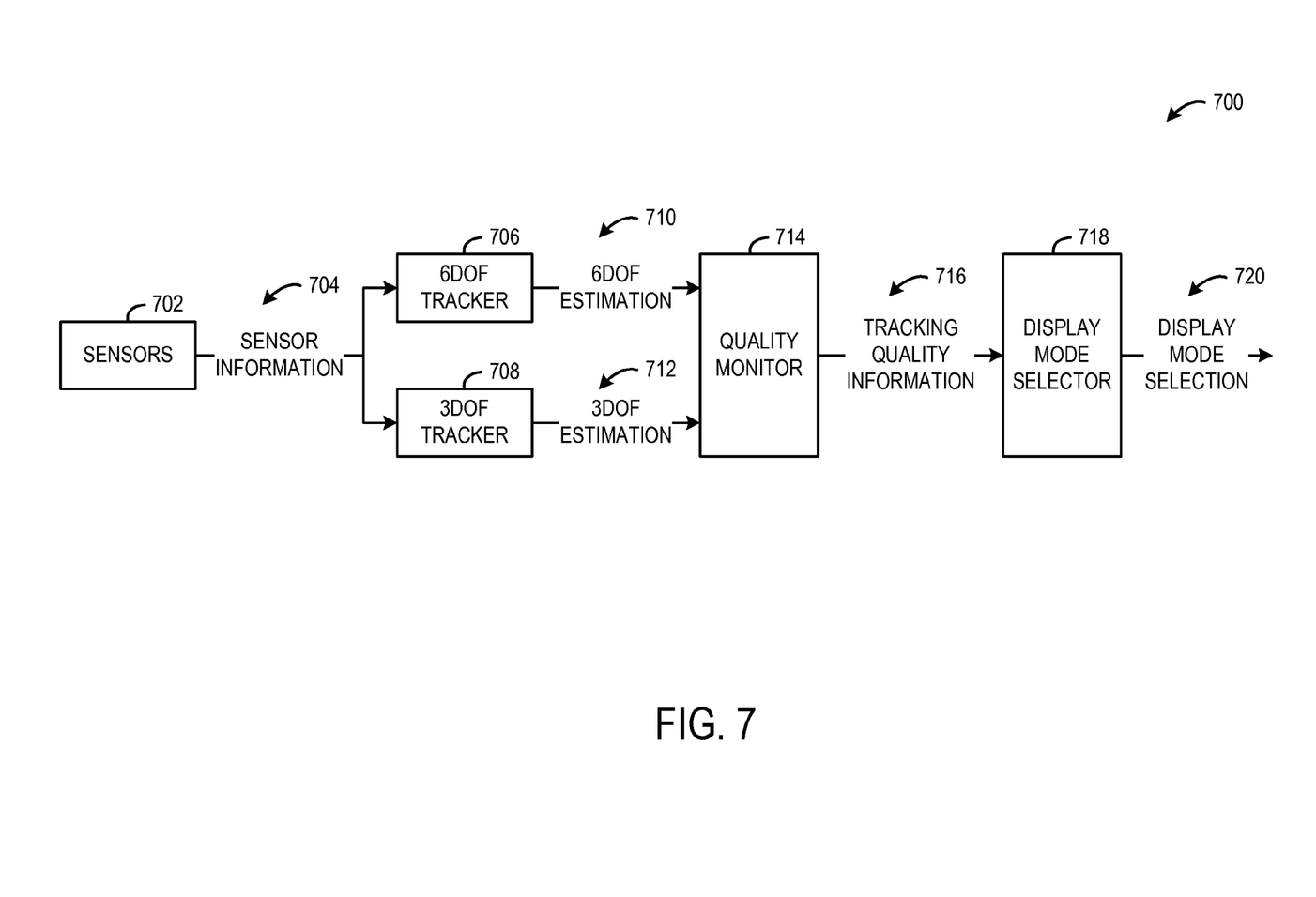
FIG. 7 schematically shows an example tracking system of a head mounted display device in accordance with an embodiment of the present disclosure.

FIG. 7 schematically shows an example tracking system 700 of a HMD device in accordance with an embodiment of the present disclosure. The tracking system 700 may be configured to select an appropriate display mode for the HMD device based on conditions of the real-world environment. The tracking system 700 may include a plurality of sensors 702 that provide location and orientation information 704 in six degrees of freedom (e.g., x, y, z, pitch, roll, yaw). For example, the plurality of sensors may include optical sensors and pose sensors. The pose sensors may not rely on optical information to determine an orientation. Non-limiting examples of pose sensor include accelerometers, gyroscopes, magnetometers, or other sensors used in deduced reckoning of a current position/orientation. The sensor information may be sent to two separate tracking filters that operate in parallel. As discussed in more detail below with respect to FIG. 9, the sensors 702 may include any suitable number and/or combination of sensors for determining a position, orientation, and/or other movement characteristics of the HMD device in up to six degrees of freedom.

The first tracking filter 706 may be configured to output an estimate 710 of a location and an orientation of the HMD device in six degrees of freedom based on the sensor information 704. The estimate 710 of the first tracking filter 706 represents highly precise and accurate rotational and translational pose data that typically relies on visible light or other optical information. In particular, a translational pose/location of the HMD device may be estimated relative to other objects in a real-world environment based on optical feedback of the environment. Further, the real-world environment may be mapped to a virtual model to determine the location of the HMD device relative to other real-world objects. Further, in some embodiments, the optical information may be used in combination with information from pose sensors to estimate the rotational pose/orientation of the HMD device. Due to the reliance on visible light, operation of the first tracking filter may be highly dependent on environmental conditions of the physical environment in which the HMD device is located.

The second tracking filter 708 may be configured to output an estimate 712 of an orientation of the HMD device in three degrees of freedom based on the sensor information 704 of pose sensors. In some embodiments, the estimate of the second tracker may be based sensor information from various sensors that do not rely on visible light or other optical information.

The estimate 710 of the location and the orientation of the HMD device in six degrees of freedom and the estimate 712 of the orientation of the HMD device in three degrees of freedom may be provided to a quality monitor 714. The quality monitor 714 may be configured to determine whether the estimates 710 and 712 meet quality metrics for accuracy and availability. For example, the quality metric may include comparing the estimates to expected values to determine whether the estimates are within a designated accuracy threshold. If the estimates are within the accuracy threshold, then the estimates may meet the quality metrics. Otherwise, the estimates may not meet the quality metrics. In another example, the quality monitor may determine whether sensor information is received from particular sensors used to produce the estimates, and if the sensor information is not available than the estimates may not meet the quality metric.

It will be understood that it may be determined whether the estimates meet the quality metrics in any suitable manner without departing from the scope of the present disclosure. For example, the quality monitor may be responsible for monitoring tick-by-tick sensor information input into the tracking system as well as assessing the estimates over longer periods to determine a sufficient degradation in quality. If tracking quality degrades either sufficiently or consistently at a duration that is perceivable by a wearer of the HMD device, the quality monitor can raise a degradation in quality event that causes a transition in display modes.

The quality monitor 716 may output tracking quality information to a display mode selector 718. For example, the tracking quality information may include determinations of whether each of the estimates 710 and 712 are accurate or meet a quality metric. The display mode selector 718 may select a display mode 720 for operation based on the tracking quality information. In particular, the display mode selector 718 may select operation in a world-locked display mode in which virtual objects are displayed on the see-through display with a world-locked position if the estimate of the location and orientation of the HMD device in six degrees of freedom meets the quality metric. Otherwise, the display mode selector selects operation in a body-locked display mode in which virtual objects displayed on the see-through display with a body-locked position. In some embodiments, the display mode selector may select a display mode based on conditions and/or events other than based on the quality of the estimates. For example, the display mode selector may switch display modes responsive to a transition event, such as a wearer initiated switch in operation.

In some embodiments, the tracking system may be implemented in hardware, such as a processing pipeline including various logical blocks or pipe stages. In some embodiments, the tracking system may be implemented as software instructions executed by a processor. In some embodiments, the tracking system may be implemented as a combination of hardware and software.

Figure 8:
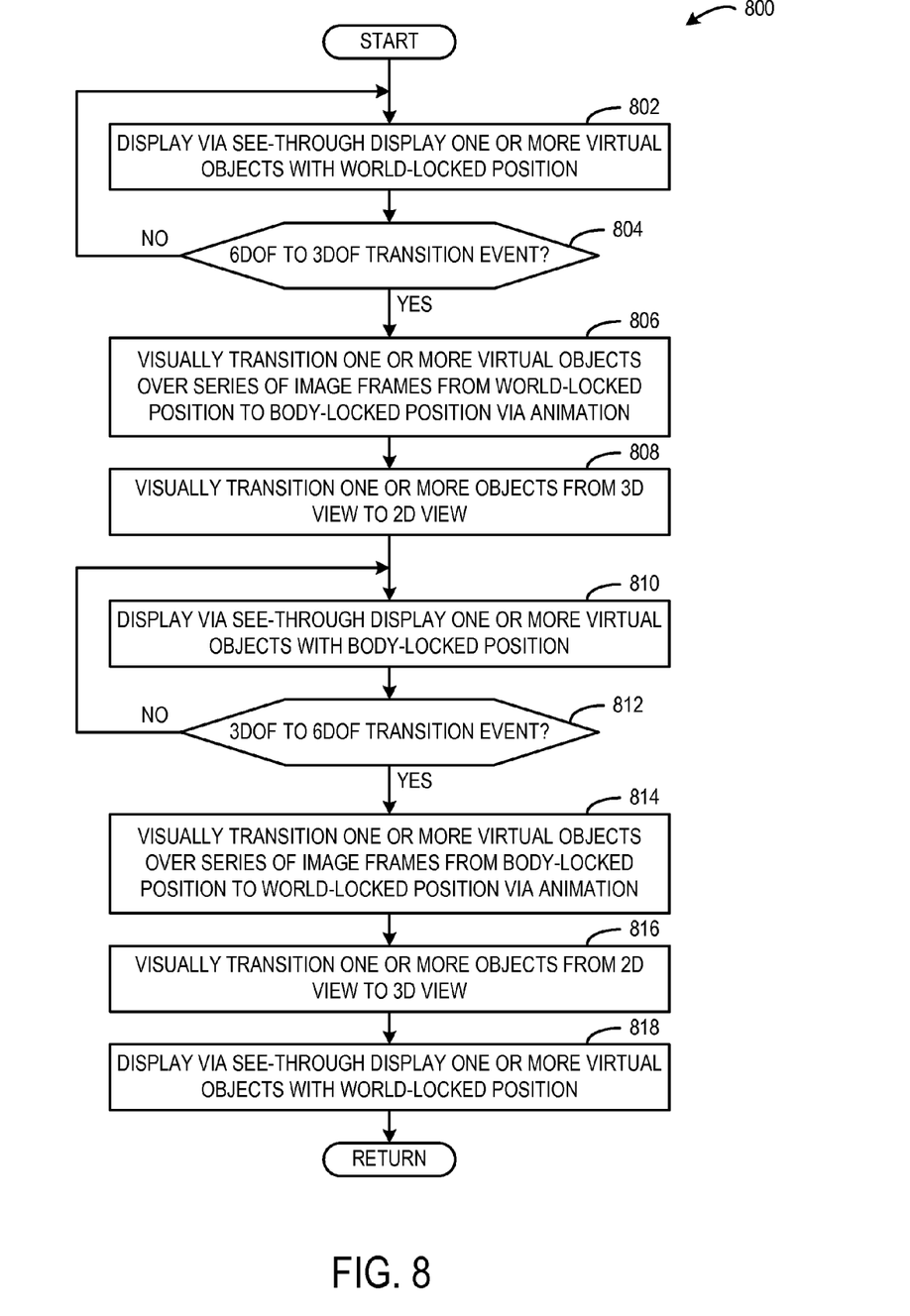
FIG. 8 shows an example method for controlling a see-through display in accordance with an embodiment of the present disclosure.

FIG. 8 shows an example method for controlling a see-through display in accordance with an embodiment of the present disclosure. For example, the method 800 may be performed by the HMD device 900 shown in FIG. 9. In another example, the method 800 may be performed by the computing system 1000 shown in FIG. 10.

At 802, the method 800 may include displaying via the see-through display one or more virtual objects with a world-locked position. The world-locked position of each virtual object may appear to be fixed relative to real-world objects viewable through the see-through display and the world-locked position of each virtual object may appear to be moveable relative to a wearer of the see-through display.

At 804, the method 800 may include determining whether a transition event occurs. The transition event may include a transition from tracking a location and an orientation of the see-through display in six degrees of freedom to tracking the orientation of the see-through display in three degrees of freedom. For example, the transition event may occur or the transition may be performed based on the location and orientation of the head-mounted display device in six degrees of freedom not meeting a quality metric, as discussed above. If it is determined that there is a transition event, then the method 800 moves to 806. Otherwise, the method 800 returns to 802.

In some embodiments, at 806, the method 800 may include visually transitioning the one or more virtual objects over a series of image frames from the world-locked position to the body-locked position via an animation.

In one particular example, a plurality of virtual objects in the form of video slates in world-locked positions may appear hanging on different walls of a room. The wearer of the see-through display may leave the room for another location in which tracking in six degrees of freedom is not available, and thus causes a transition event. Responsive to the transition event, the plurality of video slates may transition into body-locked positions appearing as a spherical workspace floating around the wearer of the see-through display. In particular, the plurality of video slates may appear to fly off of the different walls and into a predefined layout in the spherical workspace via an animation. In other words, as the wearer leaves the room the slates go with the wearer.

In some embodiments, at 808, the method 800 may include visually transitioning the one or more objects from a 3D view of the one or more virtual objects to a 2D view of the one or more virtual objects.

In one particular example, a plurality of virtual objects in the form of volumetric holograms (e.g., 3D meshes) in world-locked positions may appear located throughout a room. The wearer of the see-through display may leave the room for another location in which tracking in six degrees of freedom is not available, and thus causes a transition event. Responsive to the transition event, the plurality of volumetric holograms may collapse to a video slate in a body-locked position via an animation. The video slate may be a screen viewport (e.g., 2D view) into a virtual world of the virtual objects. The video slate in the body-locked position may go with the wearer when the wearer leaves the room.

At 810, the method 800 may include displaying via the see-through display the one or more virtual objects with a body-locked position. The body-locked position of each virtual object may appear to be fixed relative to the wearer of the see-through display and the body-locked position of each virtual object may appear to be moveable relative to the real-world objects.

At 812, the method 800 may include determining whether a transition event occurs. The transition event may include a transition from tracking the orientation of the see-through display in three degrees of freedom to tracking the location and the orientation of the see-through display in six degrees of freedom. For example, the transition event may occur or the transition may be performed based on the location and orientation of the head-mounted display device in six degrees of freedom meeting a quality metric, as discussed above. If it is determined that there is a transition event, then the method 800 moves to 814. Otherwise, the method 800 returns to 810.

In some embodiments, at 814, the method 800 may include visually transitioning the one or more virtual objects over a series of image frames from the body-locked position to the world-locked position via an animation.

In one particular example, a plurality of virtual objects in the form of video slates in body-locked positions may appear in a spherical workspace around the wearer of the see-through display. The wearer of the see-through display may enter a room from another location that causes tracking in six degrees of freedom to become available, and thus causes a transition event. Responsive to the transition event, the plurality of video slates may transition into world-locked positions on different walls of the room. In particular, the plurality of video slates may appear to fly from the spherical workspace to the different walls via an animation.

In some embodiments, at 816, the method 800 may include visually transitioning the one or more objects from a 2D view of the one or more virtual objects to a 3D view of the one or more virtual objects.

In one particular example, a plurality of virtual objects may appear to be in a video slate that is a body-locked position. The video slate may be a screen viewport (e.g., 2D view) into the virtual world of the virtual objects. The video slate in the body-locked position may go with the wearer wherever the wearer goes. The wearer of the see-through display may enter a room from another location that causes tracking in six degrees of freedom to become available, and thus causes a transition event. Responsive to the transition event, the plurality of virtual objects in the video slate may expand to volumetric holograms in world-locked positions via an animation. The volumetric holograms in world-locked positions may appear located throughout the room.

At 818, the method 800 may include displaying via the see-through display the one or more virtual objects with a world-locked position. The world-locked position of each virtual object may appear to be fixed relative to real-world objects viewable through the see-through display and the world-locked position of each virtual object may appear to be moveable relative to a wearer of the see-through display.

The above described method may be performed to provide a rich and immersive augmented reality experience with virtual objects in world-locked positions via tracking in six degrees of freedom and gracefully transitioning to providing virtual objects in body-locked positions via tracking in three degrees of freedom. Such transitions may be performed in order to mitigate degradations otherwise experienced when tracking in six degrees of freedom does not meet quality metrics or otherwise becomes unavailable.

Figure 9:
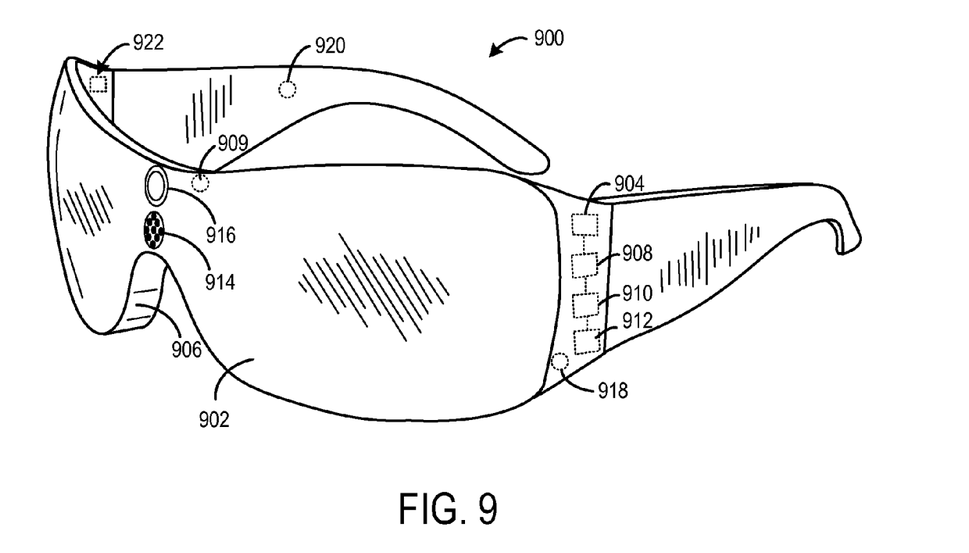
FIG. 9 shows an example of a head-mounted display device in accordance with an embodiment of the present disclosure.

With reference now to FIG. 9, one example of an HMD device 900 in the form of a pair of wearable glasses with a transparent display 902 is provided. It will be appreciated that in other examples, the HMD device 900 may take other suitable forms in which a transparent, semi-transparent, and/or non-transparent display is supported in front of a viewer's eye or eyes. It will also be appreciated that the HMD device shown in FIGS. 1-6 may take the form of the HMD device 900, as described in more detail below, or any other suitable HMD device.

The HMD device 900 includes a display system 904 and a see-through or transparent display 902 that enables images such as holographic objects to be delivered to the eyes of a wearer of the HMD device. The transparent display 902 may be configured to visually augment an appearance of a real-world, physical environment to a wearer viewing the physical environment through the transparent display. For example, the appearance of the physical environment may be augmented by graphical content (e.g., one or more pixels each having a respective color and brightness) that is presented via the transparent display 902 to create a mixed reality environment.

The transparent display 902 may also be configured to enable a wearer of the HMD device to view a physical, real-world object in the physical environment through one or more partially transparent pixels that are displaying a virtual object representation. As shown in FIG. 9, in one example the transparent display 902 may include image-producing elements located within lenses 906 (such as, for example, a see-through Organic Light-Emitting Diode (OLED) display). As another example, the transparent display 902 may include a light modulator on an edge of the lenses 906. In this example, the lenses 906 may serve as a light guide for delivering light from the light modulator to the eyes of a wearer. Such a light guide may enable a wearer to perceive a 3D holographic image located within the physical environment that the wearer is viewing, while also allowing the wearer to view physical objects in the physical environment, thus creating a mixed reality environment.

The HMD device 900 may also include various sensors and related systems. For example, the HMD device 900 may include a gaze tracking system 908 that includes one or more image sensors configured to acquire image data in the form of gaze tracking data from a wearer's eyes. Provided the wearer has consented to the acquisition and use of this information, the gaze tracking system 908 may use this information to track a position and/or movement of the wearer's eyes.

In one example, the gaze tracking system 908 includes a gaze detection subsystem configured to detect a direction of gaze of each eye of a wearer. The gaze detection subsystem may be configured to determine gaze directions of each of a wearer's eyes in any suitable manner. For example, the gaze detection subsystem may comprise one or more light sources, such as infrared light sources, configured to cause a glint of light to reflect from the cornea of each eye of a wearer. One or more image sensors may then be configured to capture an image of the wearer's eyes.

Images of the glints and of the pupils as determined from image data gathered from the image sensors may be used to determine an optical axis of each eye. Using this information, the gaze tracking system 908 may then determine a direction the wearer is gazing. The gaze tracking system 908 may additionally or alternatively determine at what physical or virtual object the wearer is gazing. Such gaze tracking data may then be provided to the HMD device 900.

It will also be understood that the gaze tracking system 908 may have any suitable number and arrangement of light sources and image sensors. For example and with reference to FIG. 9, the gaze tracking system 908 of the HMD device 900 may utilize at least one inward facing sensor 909.

The HMD device 900 may also include sensor systems that receive physical environment data from the physical environment. For example, the HMD device 900 may also include a head tracking system 910 that utilizes one or more pose sensors, such as pose sensors 912 on HMD device 900, to capture head pose data and thereby enable position tracking, direction/location and orientation sensing, and/or motion detection of the wearer's head. Accordingly, as described above, the tracking system 700 of FIG. 7 may receive sensor information from pose sensors that enable the orientation of the HMD device 900 to be estimated in three degrees of freedom or the location and orientation of the HMD device to be estimated in six degrees of freedom.

In one example, head tracking system 910 may comprise an inertial measurement unit (IMU) configured as a three-axis or three-degree of freedom position sensor system. This example position sensor system may, for example, include three gyroscopes to indicate or measure a change in orientation of the HMD device 900 within 3D space about three orthogonal axes (e.g., x, y, z) (e.g., roll, pitch, yaw). The orientation derived from the sensor signals of the IMU may be used to display, via the see-through display, one or more virtual objects with a body-locked position in which the position of each virtual object appears to be fixed relative to the wearer of the see-through display and the position of each virtual object appears to be moveable relative to real-world objects in the physical environment.

In another example, head tracking system 910 may comprise an inertial measurement unit configured as a six-axis or six-degree of freedom position sensor system. This example position sensor system may, for example, include three accelerometers and three gyroscopes to indicate or measure a change in location of the HMD device 900 along the three orthogonal axes and a change in device orientation about the three orthogonal axes.

The head tracking system 910 may also support other suitable positioning techniques, such as GPS or other global navigation systems. Further, while specific examples of position sensor systems have been described, it will be appreciated that any other suitable position sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

In some examples, the HMD device 900 may also include an optical sensor system that utilizes one or more outward facing sensors, such as optical sensor 914 on HMD device 900, to capture image data. The outward facing sensor(s) may detect movements within its field of view, such as gesture-based inputs or other movements performed by a wearer or by a person or physical object within the field of view. The outward facing sensor(s) may also capture 2D image information and depth information from the physical environment and physical objects within the environment. For example, the outward facing sensor(s) may include a depth camera, a visible light camera, an infrared light camera, and/or a position tracking camera.

The optical sensor system may include a depth tracking system that generates depth tracking data via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples, a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. For example, illumination may be provided by an infrared light source 916. It will be appreciated that any other suitable depth camera may be used within the scope of the present disclosure.

The outward facing sensor(s) may capture images of the physical environment in which a wearer of the HMD device is situated. With respect to the HMD device 900, in one example a mixed reality display program may include a 3D modeling system that uses such captured images to generate a virtual environment that models the physical environment surrounding the wearer of the HMD device. In some embodiments, the optical sensor may cooperate with the IMU to determine the location and the orientation of the head-mounted display device in six degrees of freedom. Such location and orientation information may be used to display, via the see-through display, one or more virtual objects with a world-locked position in which a position of each virtual object appears to be fixed relative to real-world objects viewable through the see-through display and the position of each virtual object appears to be moveable relative to a wearer of the see-through display.

The HMD device 900 may also include a microphone system that includes one or more microphones, such as microphone 918 on HMD device 900, that capture audio data. In other examples, audio may be presented to the wearer via one or more speakers, such as speaker 920 on the HMD device 900.

The HMD device 900 may also include a controller, such as controller 922 on the HMD device 900. The controller may include a logic machine and a storage machine, as discussed in more detail below with respect to FIG. 10, that are in communication with the various sensors and systems of the HMD device and display. In one example, the storage subsystem may include instructions that are executable by the logic subsystem to receive signal inputs from the sensors, determine a pose of the HMD device 900, and adjust display properties for content displayed on the transparent display 902.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
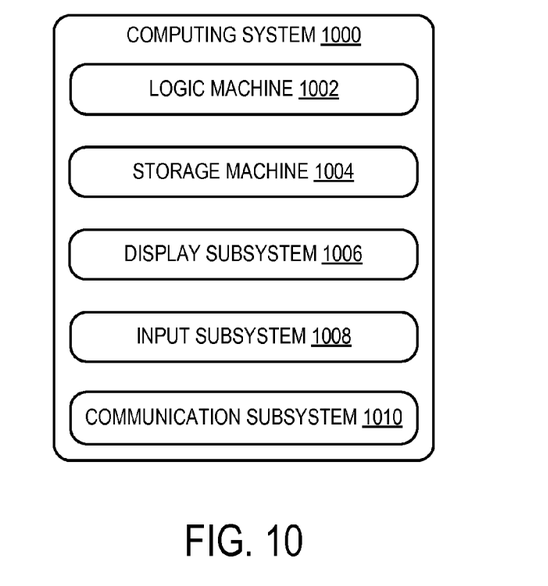
FIG. 10 schematically shows an example of a computing system in accordance with an embodiment of the present disclosure.

FIG. 10 schematically shows a non-limiting embodiment of a computing system 1000 that can enact one or more of the methods and processes described above. Computing system 1000 is shown in simplified form. Computing system 1000 may take the form of one or more head-mounted display devices, or one or more devices cooperating with a head-mounted display device (e.g., personal computers, server computers, tablet computers, home-entertainment computers, network computing devices, gaming devices, mobile computing devices, mobile communication devices (e.g., smart phone), and/or other computing devices).

Computing system 1000 includes a logic machine 1002 and a storage machine 1004. Computing system 1000 may optionally include a display subsystem 1006, input subsystem 1008, communication subsystem 1010, and/or other components not shown in FIG. 10.

Logic machine 1002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1004 includes one or more physical devices configured to hold machine-readable instructions executable by the logic machine to implement the methods and processes described herein. When such methods and processes are implemented, the state of storage machine 1004 may be transformed—e.g., to hold different data.

Storage machine 1004 may include removable and/or built-in devices. Storage machine 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1004 may include volatile, nonvolatile, dynamic, static, read/write, read-only, random-access, sequential-access, location-addressable, file-addressable, and/or content-addressable devices.

It will be appreciated that storage machine 1004 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1002 and storage machine 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1006 may be used to present a visual representation of data held by storage machine 1004. This visual representation may take the form of a graphical user interface (GUI). As the herein described methods and processes change the data held by the storage machine, and thus transform the state of the storage machine, the state of display subsystem 1006 may likewise be transformed to visually represent changes in the underlying data. Display subsystem 1006 may include one or more display devices utilizing virtually any type of technology, such as displays 902 of the HMD device 900 shown in FIG. 9. Such display devices may be combined with logic machine 1002 and/or storage machine 1004 in a shared enclosure, or such display devices may be peripheral display devices.

When included, input subsystem 1008 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; electric-field sensing componentry for assessing brain activity; any of the sensors described above with respect to head tracking system 910 of FIG. 9; and/or any other suitable sensor.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of operating a see-through display, the method comprising:
   displaying via the see-through display one or more virtual objects with a world-locked position in which a position of each virtual object appears to be fixed relative to real-world objects viewable through the see-through display and the position of each virtual object appears to be moveable relative to a wearer of the see-through display; and
   responsive to transitioning from tracking a location and an orientation of the see-through display in six degrees of freedom to tracking the orientation of the see-through display in three degrees of freedom due to the location and orientation of the head-mounted display device in six degrees of freedom not meeting a quality metric, displaying via the see-through display the one or more virtual objects with a body-locked position in which the position of each virtual object appears to be fixed relative to the wearer of the see-through display and the position of each virtual object appears to be moveable relative to the real-world objects.

2. The method of claim 1, further comprising:
   visually transitioning the one or more virtual objects over a series of image frames from the world-locked position to the body-locked position via an animation.

3. The method of claim 2, wherein the one or more virtual objects are a plurality of virtual objects and the plurality of virtual objects visually transition to a predefined layout in the body-locked position.

4. The method of claim 1, further comprising:
   visually transitioning the one or more virtual objects from a 3D view of the one or more virtual objects to a 2D view of the one or more virtual objects.

5. The method of claim 4, wherein the one or more virtual objects are displayed as volumetric holograms in the 3D view and the one or more virtual objects are displayed in a screen viewport of a virtual world in the 2D view.

6. The method of claim 1, wherein the transition event includes the see-through display moving from a visually recognized real-world location to a visually unrecognized real-world location.

7. The method of claim 6, wherein the one or more virtual objects are a plurality of virtual objects and the plurality of virtual objects is displayed according to a location-specific visual layout corresponding to the recognized real-world location.

8. A method of operating a see-through display, the method comprising:
   displaying via the see-through display one or more virtual objects with a body-locked position in which a position of each virtual object appears to be fixed relative to a wearer of the see-through display and the position of each virtual object appears to be moveable relative to real-world objects viewable through the see-through display; and
   responsive to transitioning from tracking a location and an orientation of the see-through display in six degrees of freedom to tracking the orientation of the see-through display in three degrees of freedom due to the location and orientation of the head-mounted display device in six degrees of freedom not meeting a quality metric, displaying via the see-through display the one or more virtual objects with a world-locked position in which the position of each virtual object appears to be fixed relative to the real-world objects and the position of each virtual object appears to be moveable relative to the wearer of the see-through display.

9. The method of claim 8, further comprising:
   visually transitioning the one or more virtual objects over a series of image frames from the body-locked position to the world-locked position via an animation.

10. The method of claim 9, wherein the one or more virtual objects are a plurality of virtual objects and the plurality of virtual objects visually transition to a predefined layout in the body-locked position.

11. The method of claim 8, further comprising:
    visually transitioning the one or more virtual objects from a 2D view of the one or more virtual objects to a 3D view of the one or more virtual objects.

12. The method of claim 11, wherein the one or more virtual objects are displayed in a screen viewport of a virtual world in the 2D view and the one or more virtual objects are displayed as volumetric holograms in the 3D view.

13. The method of claim 8, wherein the transition event includes the see-through display moving from a visually unrecognized real-world location to a visually recognized real-world location.

14. The method of claim 13, wherein the one or more virtual objects are a plurality of virtual objects and the plurality of virtual objects is displayed according to a location-specific visual layout corresponding to the recognized real-world location.

15. A head-mounted display device comprising:
    an inertial measurement unit (IMU) configured to determine an orientation of the head-mounted display device in three degrees of freedom;
    an optical sensor configured to capture image data of a real-world environment and cooperate with the IMU to determine a location and the orientation of the head-mounted display device in six degrees of freedom;
    a see-through display through which a real-world environment is viewable by a wearer, the see-through display being configured to display virtual objects to the wearer such that virtual objects appear to be integrated with the real-world environment, the see-through display being configured to:
  responsive to a transition from tracking the orientation of the head-mounted display device in three degrees of freedom to tracking the location and the orientation of the see-through display in six degrees of freedom, display via the see-through display one or more virtual objects with a world-locked position in which a position of each virtual object appears to be fixed relative to real-world objects viewable through the see-through display and the position of each virtual object appears to be moveable relative to a wearer of the see-through display, the world-locked position being derived from the location and orientation of the head-mounted display device in six degrees of freedom; and
  responsive to a transition from tracking the location and the orientation of the head-mounted display device in six degrees of freedom to tracking the orientation of the see-through display in three degrees of freedom, displaying via the see-through display the one or more virtual objects with a body-locked position in which the position of each virtual object appears to be fixed relative to the wearer of the see-through display and the position of each virtual object appears to be moveable relative to the real-world objects, the body-locked position being derived from the orientation of the head-mounted display device in three degrees of freedom.

16. The head-mounted display device of claim 15, wherein the transition from tracking the orientation of the head-mounted display device in three degrees of freedom to tracking the location and the orientation of the see-through display in six degrees of freedom is performed responsive to the location and the orientation of the head-mounted display device in six degrees of freedom meeting the quality metric, and the transition from tracking the location and the orientation of the head-mounted display device in six degrees of freedom to tracking the orientation of the see-through display in three degrees of freedom is performed responsive to the location and orientation of the head-mounted display device in six degrees of freedom not meeting the quality metric.

* * * * *